(12) United States Patent
Lee et al.

(10) Patent No.: US 8,320,342 B2
(45) Date of Patent: Nov. 27, 2012

(54) METHOD OF MANAGING CARRIERS IN A BROADBAND WIRELESS ACCESS SYSTEM

(75) Inventors: Eun Jong Lee, Anyang-si (KR); Ki Seon Ryu, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 12/815,230

(22) Filed: Jun. 14, 2010

(65) Prior Publication Data

US 2010/0316026 A1 Dec. 16, 2010

Related U.S. Application Data

(60) Provisional application No. 61/328,648, filed on Apr. 28, 2010, provisional application No. 61/326,215, filed on Apr. 20, 2010, provisional application No. 61/309,872, filed on Mar. 3, 2010, provisional application No. 61/224,917, filed on Jul. 13, 2009, provisional application No. 61/218,052, filed on Jun. 17, 2009, provisional application No. 61/186,384, filed on Jun. 12, 2009.

(30) Foreign Application Priority Data

Jun. 14, 2010 (KR) ........................ 10-2010-0055857

(51) Int. Cl.
*H04J 3/00* (2006.01)

(52) U.S. Cl. ........................................ 370/336; 370/345
(58) Field of Classification Search .................. None
See application file for complete search history.

(56) References Cited

U.S. PATENT DOCUMENTS

| | | |
|---|---|---|
| 2005/0041597 A1 | 2/2005 | Wang et al. |
| 2006/0142051 A1 | 6/2006 | Purnadi et al. |
| 2007/0081479 A1* | 4/2007 | Kang et al. ................... 370/310 |
| 2010/0190493 A1* | 7/2010 | Zoeckler et al. .............. 455/433 |

FOREIGN PATENT DOCUMENTS

KR 10-2007-0041526 4/2007

* cited by examiner

*Primary Examiner* — Jianye Wu
(74) *Attorney, Agent, or Firm* — Lee, Hong, Degerman, Kang & Waimey

(57) ABSTRACT

A method for managing carriers allocated to a mobile station in a broadband wireless access system supporting multiple carriers, and an apparatus for use in the method are disclosed. A carrier management method for allowing a mobile station to perform carrier management in a broadband wireless access system supporting multiple carriers includes receiving a first message, which includes activation information indicating activation of at least one target carrier from among one or more second carriers allocated through a first carrier, from a base station, and transmitting a second message, which informs the base station of readiness or non-readiness of the at least one target carrier according to a result of the activation, to the base station. The activation information includes information indicating an activation time point, and the transmitting of the second message is performed at a specific time indicated by the activation time point information.

15 Claims, 12 Drawing Sheets

(a)

(b)

US 8,320,342 B2

METHOD OF MANAGING CARRIERS IN A BROADBAND WIRELESS ACCESS SYSTEM

CROSS REFERENCE TO RELATED APPLICATIONS

Pursuant to 35 U.S.C. §119, this application claims the benefit of earlier filing date and right of priority to Korean Patent Application No. 10-2010-0055857, filed on Jun. 14, 2010, and also claims the benefit of U.S. Provisional Application Ser. Nos. 61/328,648, filed on Apr. 28, 2010, 61/326,215, filed on Apr. 20, 2010, 61/309,872, filed on Mar. 3, 2010, 61/224,917, filed on Jul. 13, 2009, 61/218,052, filed on Jun. 17, 2009, and 61/186,384, filed on Jun. 12, 2009, the contents of which are all incorporated by reference herein in their entirety.

BACKGROUND OF THE INVENTION

1. Field of the Invention

The present invention relates to a mobile communication system, and more particularly to a method for managing carriers allocated to a mobile station (MS) in a broadband wireless access system supporting multiple carriers, and an apparatus for the method.

2. Discussion of the Related Art

A brief description of carriers will be given hereinbelow.

A user may perform modulation on the amplitude, frequency, and/or phase of a sine wave or a periodic pulse wave to include information which is desired to be transmitted. At this time, the sine wave or pulse wave serving to convey information is called a carrier.

Methods for modulating a carrier include a single-carrier modulation (SCM) scheme and a multi-carrier modulation (MCM) scheme. The SCM scheme performs modulation such that all information is carried on a single carrier.

The MCM scheme divides an entire bandwidth channel of one carrier into subchannels having multiple narrow bandwidths and transmits multiple narrowband subcarriers through respective subchannels.

When using the MCM scheme, each subchannel may approximate to a flat channel due to a narrow bandwidth. A user may compensate for distortion of a channel using a simple equalizer. The MCM scheme may be implemented at a high speed using Fast Fourier Transform (FFT). Namely, the MCM scheme is favorable during high-rate data transmission as compared to the SCM scheme.

As the capabilities of a base station and/or a terminal have been developed, a frequency bandwidth which can be provided or used by the base station and/or the terminal has been enlarged. Accordingly, in the embodiments of the present invention, a multi-carrier system supporting broadband by aggregating one or more carriers is proposed.

Specifically, the multi-carrier system, which will be described hereafter, uses carriers by aggregating one or more carriers, unlike the afore-mentioned MCM scheme which uses carriers by segregating one carrier.

To efficiently use multiple bands or multiple carriers, a technique in which one medium access control (MAC) entity manages multiple carriers (e.g., multiple frequency carriers) has been proposed.

FIGS. 1(a) and 1(b) illustrate methods for transmitting and receiving signals based on a multi-band radio frequency (RF) scheme.

In FIGS. 1(a) and 1(b), one MAC layer in each of a transmitting end and a receiving end may manage multiple carriers to efficiently use the multiple carriers. To effectively transmit and receive the multiple carriers, it is assumed that both the transmitting end and the receiving end can transmit and receive the multiple carriers. Since frequency carriers managed by one MAC layer do not need to be contiguous, the above method enables flexible resource management. More specifically, the frequency carriers may have contiguous aggregation or non-contiguous aggregation.

In FIGS. 1(a) and 1(b), physical layers (PHY 0, PHY 1, ..., PHY n-2, and PHY n-1) represent multiple bands and each of the bands may have a frequency carrier (FC) size allocated for a specific service according to a predetermined frequency policy. For example, PHY 0 (RF carrier 0) may have a frequency band size allocated for a general FM radio broadcast and PHY 1 (RF carrier 1) may have a frequency band size allocated for cellular phone communication.

Although each frequency band may have a different FA size depending on the characteristics thereof, it is assumed in the following description that each frequency carrier (FC) has a size of A MHz for convenience of explanation. Each frequency allocation (FA) band may be represented by a carrier frequency that enables a baseband signal to be used in each frequency band. Thus, in the following description, each FA will be referred to as a "carrier frequency band" or will simply be referred to as a "carrier" representing each carrier frequency band unless such use causes confusion. As in the recent $3^{rd}$ generation partnership project (3GPP) long term evolution-advanced (LTE-A), the carrier may also be referred to as a "component carrier" to discriminate it from a subcarrier used in the multi-carrier system.

As such, the "multi-band" scheme may also be referred to as a "multi-carrier" scheme or a "carrier aggregation" scheme.

FIG. 2 is a view showing an example of the use of multiple carriers in a general wireless communication system.

The multiple carriers of general technology may employ contiguous carrier aggregation as shown in FIG. 2(a) or non-contiguous carrier aggregation as shown in FIG. 2(b). The combination unit of such carriers is a basic bandwidth unit of a general legacy system (e.g., Long Term Evolution (LTE) in an LTE-advanced system or IEEE 802.16e in an IEEE 802.16m system). In a multi-carrier environment of general technology, two types of carriers are defined as follows.

First, a first carrier (also called a primary carrier) is the carrier used by a Base Station (BS) and a Mobile Station (MS) to exchange traffic and full PHY/MAC control information defined in the 16 m specification. Further, the primary carrier is used for control functions for proper MS operation, such as network entry. Each MS shall have only one primary carrier per cell.

A second carrier (also called a secondary carrier) is an additional carrier which the MS may use for traffic exchange, only per BS's specific allocation commands and rules, typically received on the primary carrier. The secondary carrier may also include control signaling to support multi-carrier operation.

In the general technology, the carriers of a multi-carrier system based on the above-described primary and secondary carriers may be classified into a fully configured carrier and a partially configured carrier.

First, the fully configured carrier is a carrier for which all control signaling actions including synchronization, broadcast, multicast and unicast control channels are configured. Further, information and parameters regarding multi-carrier operation and the other carriers can also be included in the control channels.

The partially configured carrier is a carrier in which all control channels for supporting downlink (DL) transmission in a downlink carrier other than an uplink carrier during Time Division Duplexing (TDD) DL transmission or in Frequency Division Duplexing (FDD) mode are configured.

Generally, an MS may perform initial network entry through a primary carrier, and may exchange mutual multi-carrier capability information in a registration process for exchanging an Advanced Air Interface (AAI) registration request response (AAI_REG-REQ/RSP) message with a BS.

Therefore, the MS acquires information of available carrier(s) of the BS, and the MS can allocate at least one available secondary carrier to the MS. Prior to performing data exchange through the allocated carrier, the corresponding carrier must be activated. However, the carrier activation procedure has yet to be defined in the current standard.

SUMMARY OF THE INVENTION

Accordingly, the present invention is directed to a method for managing carriers in a broadband wireless access system that substantially obviates one or more problems due to limitations and disadvantages of the related art.

An object of the present invention devised to solve the problem lies on a method for effectively activating a carrier between a base station (BS) and a mobile station (MS) in a multi-carrier environment.

Another object of the present invention devised to solve the problems lies on an effective method for allowing a BS to recognize an activation status of a carrier through which the BS transmits an activation indication message to the MS.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

The object of the present invention can be achieved by providing a carrier management method for allowing a mobile station to perform carrier management in a broadband wireless access system supporting multiple carriers, the method including receiving a first message, which includes activation information indicating activation of at least one target carrier from among one or more second carriers allocated through a first carrier, from a base station; and transmitting a second message, which informs the base station of readiness or non-readiness of the at least one target carrier according to a result of the activation, to the base station, wherein the activation information includes information indicating an activation time point, and the transmitting of the second message is performed at a specific time indicated by the activation time point information.

In another aspect of the present invention, provided herein is a carrier management method for allowing a base station to manage carriers of a mobile station in a broadband wireless access system supporting multiple carriers including transmitting a first message, which includes activation information indicating activation of at least one target carrier from among one or more second carriers allocated to the mobile station through a first carrier, to the mobile station; and receiving a second message, which informs the base station of readiness or non-readiness of the at least one target carrier according to a result of the activation, from the mobile station, wherein the activation information includes information indicating an activation time point, and the receiving of the second message is performed at a specific time indicated by the activation time point information.

In another aspect of the present invention, provided herein is a mobile station for supporting a multi-carrier operation in a broadband wireless access system including a processor; and a radio frequency (RF) module for transmitting and receiving an RF signal to and from an external part upon receiving a control signal from the processor, wherein the processor acquires activation information, which indicates activation of at least one target carrier from among one or more second carriers allocated through a first carrier, through a first message received from a base station; and transmits a second message, which informs the base station of readiness or non-readiness of the at least one target carrier according to a result of the activation, to the base station, wherein the activation information includes information indicating an activation time point, and the transmitting of the second message is performed at a specific time indicated by the activation time point information.

The activation time point information may be configured in units of a superframe.

The activation information may include at least one of an action code field set to a specific value indicating management of the second carrier, a field for indicating a number of the at least one target carrier, and a field for indicating each index of the at least one target carrier.

The first carrier may be a primary carrier, and the second carrier may be an assigned secondary carrier which is allocated from the base station to the mobile station.

The first message may be a carrier management command (AAI_CM-CMD) message, the second message may be a carrier management indication (AAI_CM-IND) message, and the second carrier may be allocated to the mobile station through a multi-carrier response (AAI_MC-RSP) message.

The exemplary embodiments of the present invention have the following effects.

First, by means of the embodiments of the present invention, an effective carrier activation procedure can be defined.

Second, by means of the embodiments of the present invention, the base station (BS) can effectively recognize a status of a carrier for ordering the MS to perform activation.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

In the drawings.

DETAILED DESCRIPTION OF THE INVENTION

Figure 1:
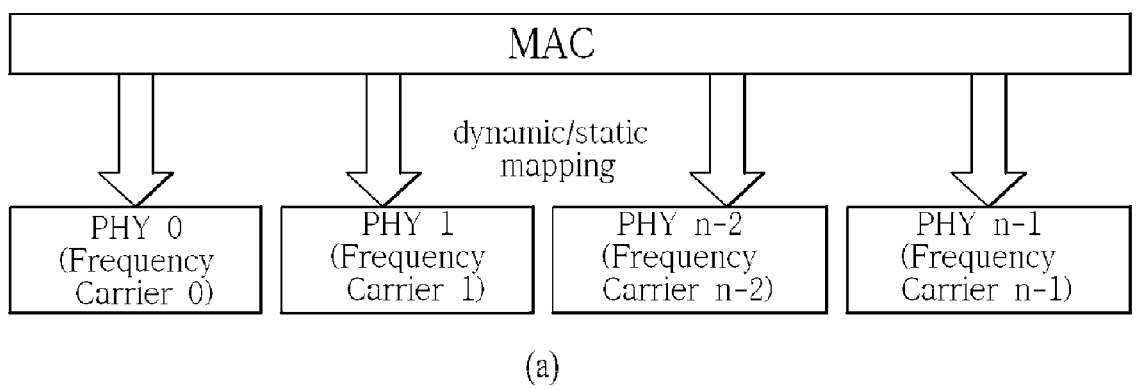
FIGS. 1(*a*) and 1(*b*) illustrate methods for transmitting and receiving signals based on a multi-band radio frequency (RF) scheme.
Figure 1:
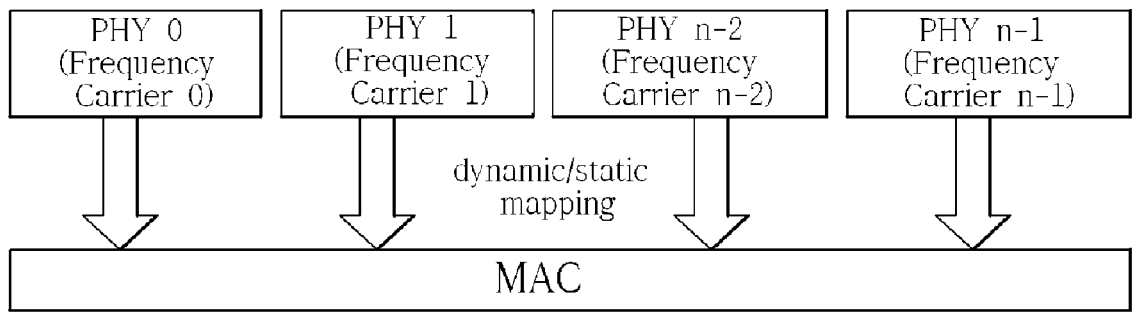
Figure 2:
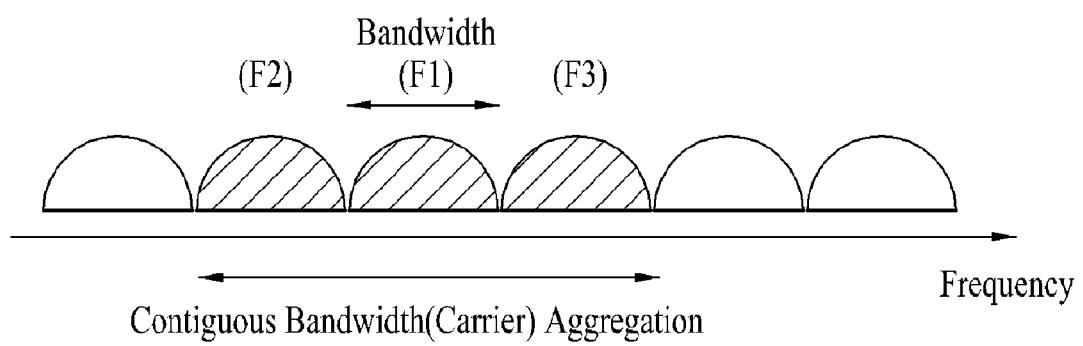
FIG. 2 illustrates a utilization example of multiple carriers in a general wireless communication system.
Figure 2:
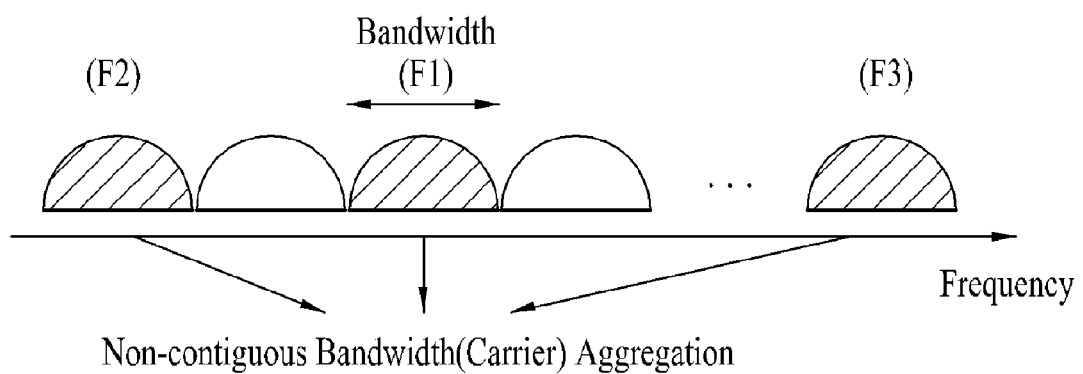

Reference will now be made in detail to the preferred embodiments of the present invention, examples of which are illustrated in the accompanying drawings. Wherever possible, the same reference numbers will be used throughout the drawings to refer to the same or like parts.

Exemplary embodiments of the present invention provide a wireless access system. The embodiments of the present invention describe methods for effectively managing multiple carriers.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may confuse the substance of the present invention, are not explained. Additionally, procedures or steps, which can be understood by those skilled in the art, are not explained as well.

In exemplary embodiments of the present invention, a description is made of a data transmission and reception relationship between a BS and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc. The term 'MS' may be replaced with the term 'User Equipment (UE)', 'Subscriber Station (SS')', 'Mobile Subscriber Station (MSS)', 'mobile terminal', 'Advanced Mobile Station (AMS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of P802.16-2004, P802.16e-2005, and P802.16Rev2 documents which are the standards of IEEE 802.16.

Specific terms used for the exemplary embodiments of the present invention are provided to help in understanding of the present invention. These specific terms may be replaced with other terms within the scope and spirit of the present invention.

The following description of the present invention assumes that the IEEE 802.16 system is used as an example. Specifically, in the following description, the MS refers to an advanced mobile station (AMS) that satisfies the IEEE 802.16m standard, and the BS refers to an advanced base station (ABS) that also satisfies the IEEE 802.16m standard.

First, terms for use in a multi-carrier operation will be defined as follows.

1. Available Carrier

The available carrier refers to all carriers belonging to the ABS. The AMS may acquire information of the available carrier through an advanced air interface global carrier configuration (AAI_Global-config) message or a multi-carrier advertisement (AAI_MC-ADV) message.

2. Assigned Carrier

The assigned carrier refers to a subset of an available carrier that is assigned to the AMS by the ABS. That is, the ABS may assign at least one of its own available carriers to an assigned secondary carrier of the ABS in consideration of the AMS capability.

3. Active Carrier

The active carrier refers to a carrier that is ready to perform data exchange between the AMS and the ABS, and may be a subset of the assigned carrier. Activation/deactivation of the assigned secondary carrier may be dependent upon the decision of the ABS based on a QoS (Quality of Service) request. The ABS may inform the AMS of information of whether to activate or deactivate a specific secondary carrier through a carrier management command (AAI_CM-CMD) message.

Based on the above-mentioned description, a procedure for allowing the ABS to assign a carrier to the AMS will hereinafter be described with reference to FIG. 3.

Figure 3:
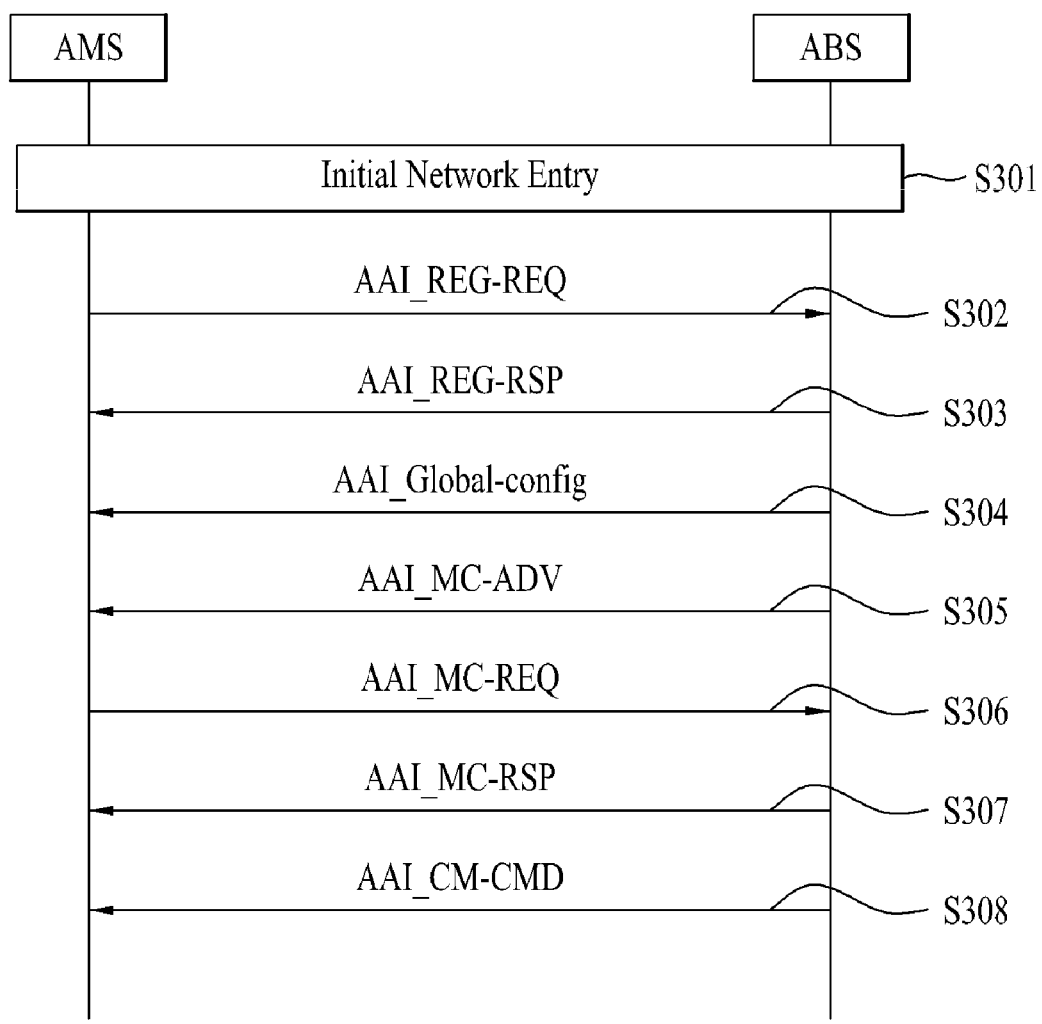
FIG. 3 is a flowchart illustrating an exemplary procedure for allowing an advanced base station (ABS) to assign one or more carriers to an advanced mobile station (AMS) in a broadband wireless access system according to one embodiment of the present invention.

FIG. 3 is a flowchart illustrating an exemplary procedure for allowing the ABS to assign one or more carriers to the AMS in a broadband wireless access system according to one embodiment of the present invention.

Referring to FIG. 3, the AMS performs initial network entry that includes a variety of processes, such as scanning, ranging, etc. in relation to the AMS in step S301.

The AMS and the ABS can exchange information about mutual multicarrier capabilities through a registration request/response (AAI_REG-REQ/RSP) message in steps S302 and S303.

The ABS transmits the AAI_REG-RSP message, and then transmits the AAI_Global-config message in step S304.

The AAI_Global-config message may include information of all available carriers supported by a network.

The AMS receives the AAI_MC-ADV message that is periodically broadcast from the ABS, such that it can acquire information about multi-carrier configuration of the ABS in step S305.

After that, the AMS informs the ABS of information about the AMS's supported carriers through the AAI_MC-REQ message according to multi-carrier configurations of the ABS's available carriers upon receiving the acquired information, such that it can request the list of assigned carriers from the ABS in step S306.

The ABS decides a subset, that will be assigned as the AMS's secondary carrier, from among the ABS's available carriers on the basis of information received from the AMS, decides the list of assigned carriers, and informs the AMS of the decided list of assigned carriers through the AAI_MC-RSP message.

Thereafter, the ABS may transmit a carrier management command (AAI_CM-CMD) message to the AMS according to the decision based on the QoS request, such that it determines whether to activate or deactivate the assigned carrier given to the AMS in step S308.

First Embodiment

An effective method for newly activating the AMS's assigned secondary carrier on the basis of the above-mentioned multicarrier assignment process according to one embodiment of the present invention will hereinafter be described in detail.

1. Scanning Execution

The assigned carrier, that is assigned from the AMS to the AMS, may receive an indication message for scanning execution from the ABS before the AMS is activated by an activation indication message (e.g., AAI_CM-CMD) message received from the ABS. The scanning may be triggered by any of a conventional scanning response (AAI_SCN-RSP) message through a primary carrier, a carrier management command (AAI_CM-CMD) message, or a newly-defined message.

If it is assumed that the scanning is triggered by the AAI_CM-CMD message, a method, wherein a value for representing the scanning indication may be added to a carrier management type field of the AAI_CM-CMD message, can be used.

A single carrier AMS capable of supporting only a single carrier needs to configure a scanning interval for each neighbor frequency or each neighbor ABS in order to perform the scanning. However, a multicarrier AMS capable of supporting multiple carriers can simultaneously scan other frequency bands (i.e., carriers), such that an additional scanning interval is not required for scanning the assigned carrier. Thus, a parameter for configuring the scanning interval may be omitted from the message for indicating the scanning of the assigned secondary carrier of the multi-carrier AMS. Instead of the above-mentioned parameter, it is preferable that logical/physical carrier indexes for carriers to be scanned and other parameters related to the scanning report be contained in the corresponding message.

2. Parameter Configuration of AAI_CM-CMD Message

As described above, the ABS may command the AMS to activate the secondary carrier through the AAI_CM-CMD message. The AAI_CM-CMD message includes a field (i.e., an action code field) for indicating a carrier management type, such that the ABS may inform the AMS whether the indication through the corresponding message corresponds to either the activation/deactivation of the secondary carrier or the primary carrier change.

At this time, in order to activate carriers, in the case where the scanning of the assigned carrier is performed by the above-mentioned method before the ABS transits the AAI_CM-CMD message to the AMS, and thus the scanning report is carried out, the ABS newly selects a carrier suitable for the activation by referring to the scanning result, reflects the selected result in the AAI_CM-CMD message, and transmits the reflected result to the AMS.

Hereinafter, parameters contained in the AAI_CM-CMD message according to the embodiment of the present invention will be described in detail. For convenience of description, a detailed description of the action code field having been already described will herein be omitted.

Indication Type:

A parameter of the indication type indicates activation or deactivation.

Target Carrier Index:

The target carrier index indicates a physical or logical carrier index of a target carrier to be activated through a corresponding message.

Activation Deadline:

After the AAI_CM-CMD message is transmitted to the AMS, the activation deadline parameter indicates a specific time point (or a deadline time point) at which the AMS can transmit a message capable of confirming the activation completion of the activation-indicated carrier through the corresponding message. At this time, a message (CM ACK) for confirming activation completion is conceptually distinguished from a message acknowledgement response (AAI_MSG-ACK) message for indicating the success or failure of message reception or an acknowledgement response extended header (ACK EH). For the CM ACK message, a carrier management indication (AAI_CM-IND) message may be used. A value of the activation deadline field may be represented in units of a superframe, and may represent a superframe number as a predetermined number of bits (e.g., 6 least significant bits (LSBs) of the superframe number). If the activation deadline is implemented as an activation timer, the activation timer may indicate a specific time where the corresponding time has expired, or may establish a timer value therein. In order to activate a carrier (hereinafter referred to as a "target carrier"), activation of which is indicated by the AAI_CM-CMD message, the activation deadline parameter is differently established in consideration of not only the necessity of ranging but also an SFH change count value. If the activation deadline field parameter is used as a parameter of the CM ACK available time, this activation deadline parameter value may refer to a specific time for which the AMS having received the secondary carrier management message can transmit the ACK message.

Ranging Indicator:

The ranging indicator may indicate whether periodic ranging is required for a target carrier using only one bit. If the ranging indicator is set to '1', it is preferable that the AMS finishes the ranging and activation of the target carrier before transmitting the AAI_CM-IND message. In contrast, if the ranging indicator is set to '0', the AMS can transmit the AAI_CM-IND message to the ABS by recognizing only the activation completion of the target carrier.

"SFH Change Count for Newly Activated Carrier" or "SFH Update Request Bit Per Carrier":

If a parameter denoted by either "SFH change count for newly activated carrier" or "SFH update request bit per carrier" is changed, the AMS newly receives and updates the SFH of a corresponding carrier. If there is no change in the "SFH change count for newly activated carrier" (or "SFH update request bit per carrier") parameter, the AMS directly perform ranging (in the case where a ranging indictor is established), or may transmit the AAI_CM-IND message after completing the assigned carrier. In the case where the ABS recognizes a current SFH update status of the AMS, the ABS may directly transmit an update request to the AMS (where the above-mentioned case may further include another case in which no SFH update of a target carrier is required because the same change count value is used or because a value needed for carrier activation in the SFH of the target carrier is identical to a primary carrier).

Secondary Carrier Bitmap:

In the secondary carrier bitmap, a bit of a carrier that is activated by a logical carrier index is set to '1'.

Number of Target Carrier:

"Number of Target Carrier" refers to the number of secondary carriers being activated and/or deactivated by a corresponding message.

"Segment Type" or "Combined Feedback Indication":

In the case where a single data unit is divisionally transmitted through several carriers, "Segment Type" or "Combined Feedback Indication" may indicate whether the single data unit is segmented in a Medium Access Control (MAC) layer or a physical (PHY) layer. If the single data unit is segmented in the MAC layer, it is preferable that a feedback channel (e.g., CQICH) be assigned to each carrier. In contrast, if the single data unit is segmented in the PHY layer, a single feedback channel for the entire carrier via which corresponding data is transmitted is needed, but it is possible for the pre-activated carrier (e.g., a primary carrier) to substitute for the single feedback channel, such that an additional feedback channel need not be assigned. Therefore, if a value of the segment type field indicates a PHY segment, the activated carrier may be indicated through an index or bitmap. If a value of the segment type field indicates the MAC segment, the activated carrier may be indicated by bitmap, index and/or information for feedback channel allocation.

Feedback Channel Allocation Information Element (IE):

"Feedback channel allocation IE" includes information for allocating a feedback channel to a specific carrier. Under the condition that a feedback channel is allocated to a deactivated carrier from among the assigned carriers although a target carrier to be activated is not explicitly indicated, the AMS may implicitly recognize that activation of the deactivated carrier is indicated.

The above-mentioned parameters may be optionally contained in the AAI_CM-CMD message.

Next, various examples of the AAI_CM-CMD message achieved by the combination of the above-mentioned parameters according to one embodiment of the present invention will hereinafter be described in detail.

Table 1 exemplarily illustrates some parts of the AAI_CM-CMD message configuration according to one embodiment of the present invention.

TABLE 1

| M/O | Attributes/ Array of attributes | Size (bits) | Value/Note | Conditions |
|---|---|---|---|---|
| M | Action code | 1 | Indicate the purpose of this message<br>0b0: secondary carrier management<br>0b1: primary carrier change | NA |
| O | Indication Type | 2 | Indicate the corresponding secondary carrier is activated or deactivated<br>00: no action<br>01: deactivation only<br>10: activation only<br>11: both activation and deactivation | Shall be present when Action code is set to 0b0 in AAI_CM-CMD message |
| O | Activation Deadline | 6 | LSB bits of Superframe number after the AAI_CM-CMD is sent for the AMS to confirm the activation of secondary carrier by sending the AAI_CM-IND message | Shall be present when Indication Type is set to 10 or 11 in AAI_CM-CMD message |
| O | Num of target carrier | 3 | Indicate the number of secondary carriers) to be activated or deactivated<br>1 . . . 8 | Shall be present when Indication Type is set to 01 or 10 or 11 in AAI_CM-CMD message |
| O | Target carrier index | 3 | Indicate the secondary carrier index to be activated or deactivated<br>1 . . . 8 | Shall be present when Indication Type is set to 01 or 10 or 11 in AAI_CM-CMD message |
| O | Activation of DL/UL | 1 | Indicate the activation of DL or UL in the corresponding secondary carrier<br>0b0: Both DL/UL of the secondary carrier are activated<br>0b1: DL of the secondary carrier is activated but UL of the secondary carrier is not activated | Shall be present when Indication Type is set to 10 or 11 in AAI_CM-CMD message |
| O | Ranging indicator | 1 | Indicate the periodic ranging is required for the carrier<br>0b0: no initial or periodic ranging is required for the carrier | Shall be present when Indication Type is set to 10 or 11 in |

TABLE 1-continued

| M/O | Attributes/ Array of attributes | Size (bits) | Value/Note | Conditions |
|---|---|---|---|---|
| | | | 0b1: periodic ranging is required for the carrier | AAI_CM-CMD message or shall be present when Action code is set to 0b1 in AAI_CM-CMD message |
| O | Deactivation of DL/UL | 1 | Indicate the deactivation of DL or UL in the corresponding secondary carrier<br>0b0: Both DL/UL of the secondary carrier are deactivated<br>0b1: UL of the secondary carrier is deactivated but DL of the secondary carrier is kept active | Shall be present when Indication Type is set to 01 or 11 in AAI_CM-CMD message |

Referring to Table 1, the AAI_CM-CMD message according to one embodiment of the present invention may include a variety of fields, i.e., fields of action code, indication type, activation deadline, number of Target Carriers, target carrier index, ranging indicator, and uplink/downlink (UL/DL) indicator (also denoted by Deactivation of DL/UL). Table 1 exemplarily shows parameters related to activation/deactivation of the secondary carrier. If the corresponding message is used for the primary carrier change, it may further include other parameters (e.g., a field of a physical index of a primary carrier to be changed, a field of an action time for indicating a carrier change time point in units of an SFH, and a field for indicating a next status of a previous primary carrier, etc.) or may also include such other parameters as substitutes.

The following table 2 illustrates another example of the AAI_CM-CMD message according to one embodiment of the present invention.

TABLE 2

| Syntax | Size (bit) | Notes |
|---|---|---|
| Carrier Management message { | | |
| Management Message type = xxx | 8 | Carrier Management Message |
| Carrier Management type | 2 | 0b00: secondary carrier management<br>0b01: primary carrier change<br>0b10: carrier switching<br>0b11: reserved |
| If (message type == 00){ | | |
|     Secondary carrier Bitmap | Variable (Number of assigned carriers − 1) | 0: secondary carrier deactivation<br>1: secondary carrier activation |
| } | | |
| If (message type == 01 or 10){ | | |
|     Logical Carrier Index of target carrier | TBD | Logical Carrier Index of target carrier<br>If carrier management type is primary carrier change, the target carrier shall be the one of the fully configured carriers. Else, it is the one of partially configured carriers. |
|     Activation Deadline | TBD | The value is defined with super-frame number. |
|     If (message type == 10){ | | |
|         Switching mode | 1 | 0: Event-triggered switching<br>1: Periodic switching |
|         Switching interval | TBD | The interval assigned to partially configured carrier. This value is defined in units of super-frame. |
|         If (switching mode == 0){ | TBD | |
|             Switching period | TBD | The duration of periodic switching. The value is defined in units of super-frame. |
|         } | | |
|     } | | |
| } | | |
| } | | |

In a configuration of the message shown in Table 2, the activated/deactivated secondary carriers may be simultaneously indicated through a bitmap.

Table 3 illustrates another example of the AAI_CM-CMD message configuration according to one embodiment of the present invention.

TABLE 3

| Syntax | Size (bit) | Notes |
|---|---|---|
| Carrier Management message { | | |
| Management Message type = xxx | 8 | Carrier Management Message |
| If (message type == 00){ | | |
|     Indication Type | 2 | Bitmap indication<br>#0: Activated carrier<br>#1: Deactivated carrier |
|     If (Indication Type #0 == 1){ | | |
|         Number of activated carrier | 3 | The number of newly activated carrier(s) |
|         for (i=0; i++; i< Number of activated carrier){ | | |
|             Activated Logical carrier index | 3 | Logical Carrier Index of activated carrier(s) |
|         } | | |
|     } | | |
|     If (Indication Type #1 == 1){ | | |
|         Number of deactivated carrier | 3 | The number of deactivated carrier(s) |
|         for (i=0; i++; i< Number of deactivated carrier){ | | |
|             Deactivated Logical carrier index | 3 | Logical Carrier Index of deactivated carrier(s) |
|         } | | |
|     } | | |
| } | | |
| If (message type == 01 or 10){ | | |
|     see table 2 | | |
|     If (message type == 10){ | | |
|         see table 2 | | |
|     } | | |
| }} | | |

In the message configuration shown in Table 3, the activated/deactivated carriers may be indicated through the number of target carriers and the logical index of carriers.

Table 4 illustrates yet another example of the AAI_CM-CMD message configuration according to one embodiment of the present invention.

TABLE 4

| Syntax | Size (bit) | Notes |
|---|---|---|
| Carrier Management message { | | |
| Management Message type = xxx | 8 | Carrier Management Message |
| Carrier Management type | 2 | 0b00: secondary carrier management<br>0b01: primary carrier change<br>0b10: carrier switching<br>0b11: reserved |
| If (message type == 00){ | | |
|     Secondary carrier Bitmap | Variable (Number of assigned carriers − 1) | 0: secondary carrier deactivation<br>1: secondary carrier activation |
|     Segment type (or Combined Feedback indication) | 1 | 0b0: MAC segmented carrier (or separated Feedback)<br>0b1: PHY segmented carrier (or combined Feedback) |
|     If (Segment type== 0){ | | |
|         Number of carrier | 3 | The number of newly activated carrier(s) |
|         for (i=0; i++; i< Number of carrier){ | | |
|             Feedback Channel | Variable | |

TABLE 4-continued

| Syntax | Size (bit) | Notes |
|---|---|---|
| Allocation IE( ) | | |
| } | | |
| } | | |
| } | | |
| If (message type == 01 or 10){ | | |
|     see table 2 | | |
|     If (message type == 10){ | | |
|         see table 2 | | |
|     } | | |
| }}} | | |

In the message configuration as shown in Table 4, the activated carrier may be indicated through a bitmap and feedback channel allocation information (if the segment type is indicative of the MAC segment) of the activated carrier. The segment type used in this embodiment may be replaced with the combined feedback indication. That is, the combined Feedback indication may indicate whether a feedback channel is to be allocated to each carrier, or a feedback of the overall activated carrier is to be transmitted using one feedback channel (that is merged in a feedback channel allocated to the primary carrier and reports channel quality indicator (CQI)).

Table 5 illustrates another example of the AAI_CM-CMD message configuration according to one embodiment of the present invention.

TABLE 5

| Syntax | Size (bit) | Notes |
|---|---|---|
| Carrier Management message { | | |
| Management Message type = xxx | 8 | Carrier Management Message |
| Carrier Management type | 2 | 0b00: secondary carrier management |
| | | 0b01: primary carrier change |
| | | 0b10: carrier switching |
| | | 0b11: reserved |
| If (message type == 00){ | | |
|     Indication Type | 1 | 0b0: Carrier activation |
|     (or bitmap) | | 0b1: Carrier deactivation |
|     Number of carrier | 3 | The number of activated or deactivated carrier(s) |
|     Segment type | 1 | 0b0: MAC segmented carrier (or separated Feedback) |
|     (or Combined Feedback indication) | | 0b1: PHY segmented carrier (or combined Feedback) |
|     for (i=0; i++; i< Number of carrier){ | | |
|         If (Segment type ==1){ | | |
|             Logical carrier index | 3 | Logical Carrier Index of activated or deactivated carrier(s) |
|         } | | |
|         If (Segment type== 0){ | | |
|             Feedback Channel Allocation IE( ) | Variable | |
|         } | | |
|     } | | |
| } | | |
| If (message type == 01 or 10){ | | |
|     See table 2 | | |
|     If (message type == 10){ | | |
|     See table 2 | | |
|     { | | |
| } | | |
| } | | |

Figure 4:
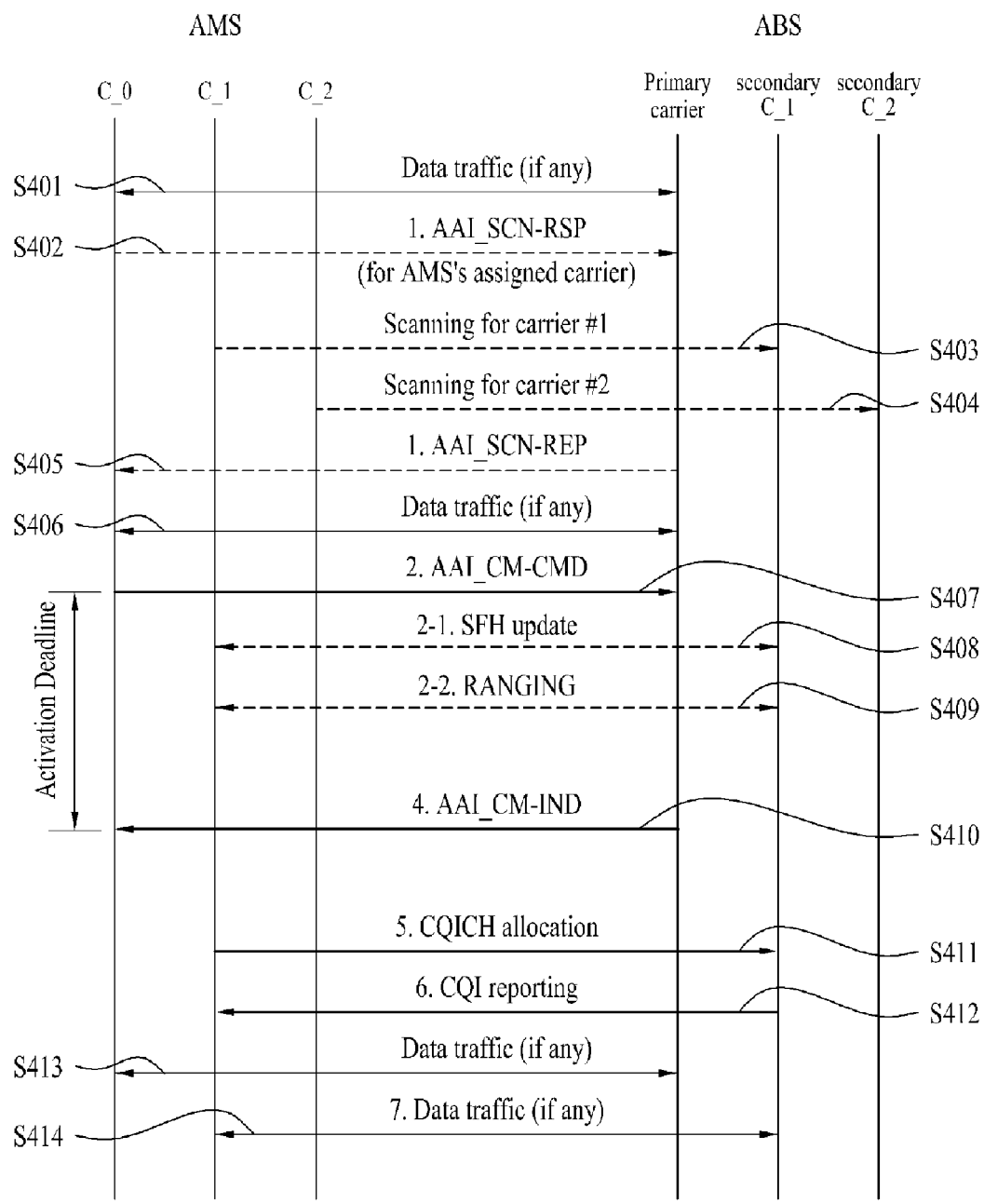
FIG. 4 is a flowchart illustrating a secondary carrier activation procedure according to one embodiment of the present invention.

Although the message configuration of Table 5 is similar to that of FIG. 4, it can be recognized that the bitmap of Table 4 is replaced with a logical carrier index.

Table 6 illustrates yet another example of the AAI_CM-CMD message configuration according to one embodiment of the present invention.

TABLE 6

| Syntax | Size (bit) | Notes |
| --- | --- | --- |
| Carrier Management message { | | |
| Management Message type = xxx | 8 | Carrier Management Message |
| Carrier Management type | 2 | 0b00: secondary carrier management<br>0b01: primary carrier change<br>0b10: carrier switching<br>0b11: reserved |
| If (message type == 00){ | | |
|    Segment type<br>   (or Combined Feedback indication) | 1 | 0b0: MAC segmented carrier (or separated Feedback)<br>0b1: PHY segmented carrier (or combined Feedback) |
|    If (Segment type== 0){ | | |
|       Number of carrier | 3 | The total number of activated and deactivated carrier(s) |
|       for (i=0; i++; i< Number of carrier){ | | |
|          Feedback Channel Allocation IE( ) | Variable | The carrier is referred by the Logical Carrier Index in Feedback Channel Allocation IE( ).<br>Secondary carrier activation by the Feedback channel allocation<br>Secondary carrier deactivation by the Feedback channel deallocation |
|       } | | |
|    } | | |
|    If (Segment type == 1) | | |
|       Secondary carrier Bitmap | Variable (Number of assigned carriers – 1) | 0: secondary carrier deactivation<br>1: secondary carrier activation |
|    } | | |
| } | | |
| If (message type == 01 or 10){<br>See table 2 | | |
| If (message type == 10){<br>See table 2 | | |
| }}} | | |

In the message configuration shown in Table 5, in case of the MAC segmentation, feedback channel allocation/deallocation may indicate carrier activation/deactivation. In case of PHY segmentation, carrier activation/deactivation may be indicated by a bitmap.

Meanwhile, according to another aspect of the embodiment, the activation deadline field may be contained even in a message used in a multi-carrier handover (MCHO) procedure.

In the MCHO procedure, a serving ABS may inform an AMS of target ABS's carrier information (e.g., target primary carrier index) through a handover command (AAI_HO-CMD) message. The serving ABS exchanges information with the target ABS(s) over a backbone network, such that it can pre-assign secondary carriers prior to handover (HO) execution. The serving ABS can transmit multi-carrier request (AAI_MC-REQ) message information received from the AMS to the target ABS in such a manner that the target ABS can perform secondary carrier pre-assignment for the AMS.

In the case where the Carrier_Preassignment_Indication field of the handover command (AAI_HO-CMD) message is set to '1', carrier pre-assignment information is transmitted from the target ABS to the serving ABS over a backbone network, and the corresponding information is re-transmitted to the AMS through the AAI_HO-CMD message. Thus, some parts of secondary carriers indicated by the carrier pre-assignment information acquired by the AMS may be activated just after the AMS performs network re-entry. The AMS may perform activation on the secondary carrier indicated by a carrier status bitmap in the AAI_Ho-CMD message, and it is preferable that the activation of the secondary carrier be performed after the ranging response (AAI_RNG-RSP) message is received. After the AMS performs network re-entry, the target ABS may transmit data through the newly-activated secondary carrier. Preferably, the data transmission of the target ABS may be performed after the AMS informs the target ABS of carrier activation or deactivation through a carrier management indication (AAI_CM-IND) message. In this case, it is preferable that a specific time at which the AAI_CM-IND message is to be transmitted or a deadline point be established. For this purpose, another aspect of the embodiment proposes a method for including an activation deadline field in the AAI_RNG-RSP message. Examples of the activation deadline field are shown in Table 7.

Table 7 illustrates an example in which the activation deadline field is contained in the AAI_RNG-RSP message according to another aspect of the present invention.

TABLE 7

| M/O | Attributes/Array of attributes | Size (bits) | Value/Note | Conditions |
|---|---|---|---|---|
| O | Activation Deadline | 6 | 1.83 bits of Superframe number after the AAI_RNG-RSP message to confirm the activation of pre-assigned secondary carrier by sending the AAI CM-IND message. | It shall be included when the target ABS has pre-assigned the secondary carriers through AAI HO-CMD. |

Referring to Table 7, the activation deadline field is contained in the AAI_RNG-RSP message. The activation deadline field may represent a time point (or a deadline), where the AA_CM-IND message for enabling the AMS to inform the ABS of the activation or deactivation of the pre-assigned secondary carrier is to be transmitted, in units of an SFH. Preferably, if a secondary carrier is pre-assigned through the AAI_HO-CMD message, the activation deadline field may always be contained in the AAI_RNG-RSP message. If the AAI_CM-IND message is not received before a time point indicated by the activation deadline field is reached, the target ABS determines that the pre-assigned secondary carrier fails to be activated, such that it may command the AMS of a secondary carrier to be newly activated by sending the AAI_CM-CMD message to the AMS.

3. Report of Activation or Deactivation of Target Carrier

As described above, for a target carrier, activation of which is indicated through the AAI_CM-CMD message, the AMS needs to transmit a message telling the activation or deactivation to the ABS until reaching a specific time point (in units of a superframe) indicated by the activation deadline field or before the activation timer is expired.

At this time, one embodiment of the present invention proposes a method for including the following parameters shown in Table 8 in the AAI_CM-IND message.

TABLE 8

| Field | Size | Description |
|---|---|---|
| AAI_Carrier Management Indication message format( ){ | | |
| Action code | 1 | 0: Secondary carrier management<br>1: Primary carrier change |
| Action Status | 1 | When an AMS receives the AAI_CM-CMD, the AMS informs its status (Success/Ready or Fail) for the corresponding action.<br>0: it is not ready to perform the corresponding action. If the action code is '0' this means the target carriers are partially ready.<br>1: it is ready to perform the corresponding action. If the action code is '0' this means the all target carriers are ready. |
| If (Action code == 0 & Action Status == 0){ | | |
| Readiness Bitmap | Number of assigned carrier | Bitmap of assigned carriers.<br>0: Not ready 1: Ready |
| }<br>}<br>} | | |

Referring to Table 8, the AAI_CM-IND message may include an action status field and a readiness bitmap field. Detailed descriptions of individual fields are as follows.

The action status field may represent whether an indication message transmitted from the ABS to the AMS is carried out through the AAI_CM-CMD message. For example, if the action status field is set to '0', this means that indication items of the ABS are not carried out. In contrast, if the action status field is set to '1', this means that all the indication items of the ABS have been performed. In more detail, if the action code is set to '0' indicating secondary carrier management, namely, if the item indicated to the AMS by the AAI_CM-CMD message is indicative of activation/deactivation (i.e., the secondary carrier management) of the secondary carrier and the action status field is set to '0', this means that all the target carriers are not activated. In contrast, if the action status field is set to '1', this means that the activation of all the target carriers is completed.

Next, if the action code field and the action status field are set to '0', the readiness bitmap can represent a target carrier, which is not ready for the activation/deactivation indicated through the AAI_CM-CMD message, in the form of a bitmap.

Here, the term "ready status" of the target carrier means that hardware (H/W) setting for the target carrier, ranging, and SFH update are all completed.

The bitmap may indicate a ready status for all assigned secondary carriers (including active carriers) (for example, if the number of assigned carriers is N, the ready status for the N assigned carriers may be indicated through N bitmaps). Otherwise, the bitmap may indicate a ready status of a target carrier that is indicated to be newly activated by the AAI_CM-CMD message (where the order of target carriers may be determined to be the order of target carriers arranged in the AAI_CM-CMD message, or may be determined in ascending or descending numerical order of the logical/physical carrier indexes). However, it is preferable that the bitmap field be optionally used as necessary.

In the meantime, the ABS having received the above-mentioned AAI_CM-IND message may allocate a channel quality indicator channel (CQICH) to the target carrier, a ready status of which is indicated by the readiness bitmap field. The AMS having received the CQICH for an arbitrary target carrier can transmit a CQI report for the corresponding carrier to the ABS.

Assuming that a CQICH for the secondary carrier is transmitted through each secondary carrier, it is preferable that the AMS transmits the AAI_CM-IND message to the ABS and always monitors an A-MAP of each carrier having a readiness bitmap of 1.

Assuming that the CQICH for the secondary carrier is transmitted through a primary carrier, the AMS receives CQICH information through the primary carrier, transmits a CQI report for the activated target carrier, and then monitors the A-MAP of each carrier having a readiness bitmap of 1.

The example of the carrier activation procedure will hereinafter be described with reference to FIG. 4.

FIG. 4 is a flowchart illustrating a secondary carrier activation procedure according to one embodiment of the present invention.

Referring to FIG. 4, it is assumed that the ABS uses three carriers (C_0 to C_2) as available carriers, the C_0 carrier is set to a primary carrier of the AMS, and the remaining carriers C_1 and C_2 are set to the assigned secondary carriers (i.e., the exchange of AAI_MC-REQ/RSP message has been completed).

First, the AMS can exchange data with the ABS through the primary carrier C_0 in step S401.

The ABS transmits a scan response (AAI_SCN-RSP) message as necessary, such that it can command the AMS to scan the assigned secondary carriers in step S402.

Therefore, the AMS respectively scans C_1 and C_2 carriers in steps S403 and S404, and reports the scanning result to the ABS in step S405.

Thereafter, while the ABS and the AMS exchange data traffic with each other in step S406, the ABS may transmit the AAI_CM-CMD message to the AMS so as to either satisfy a QoS or indicate activation of the C_1 carrier owing to other reasons.

If necessary or in response to the parameter setup value of the AAI_CM-CMD message, the AMS performs the SFH update of the target carrier (C_1) in step S408 or performs periodic ranging of the target carrier (C_1) in step S409.

If the activation of the corresponding carrier has been completed before the activation deadline has elapsed, the AMS transmits the AAI_CM-IND message to the ABS so as to inform the ABS of the completion of the carrier activation in step S410.

Therefore, the ABS allocates CQICH to the AMS in step S411, and the AMS reports the CQI to the ABS in step S412.

Thereafter, the AMS and the ABS exchange data with each other through the primary carrier (C_0) in step S413, and also exchange data with each other through the newly-activated secondary carrier (C_1) in step S414.

4. Error Handling

If the activation deadline has elapsed or if the activation timer has expired, the ABS retransmits the AAI_CM-CMD message to the AMS, and repeats the deadline reset/timer update and the retransmission procedure until all the target secondary carriers are activated.

If a maximum number of transmission times of the AAI_CM-CMD message is pre-established, the indicated target carrier may be updated through a next AAI_CM-CMD message.

Otherwise, if the activation deadline has elapsed or if the activation time has expired, the ABS may cancel (i.e., no retransmission of AAI_CM-CMD) the activation of the target carrier.

Meanwhile, in some cases, although the AMS transmits the AAI_CM-IND message either before reaching the activation deadline or before the expiration of the activation timer, a target carrier requested by the ANS may be different from a carrier (this carrier appears when the readiness bitmap of the AAI_CM-IND message has a ready status) activated by the AMS. In this case, if a current QoS of the ABS and other requirements are not satisfied, the ABS may re-inform the AMS of the target carrier through the AAI_CM-CMD message, or may also inform the AMS of a new target carrier through the AAI_CM-CMD message. In addition, assuming that the ABS allows a carrier to be arbitrarily activated by the AMS, the ABS allocates a feedback channel to the activated carrier and informs the AMS of the activation allowance.

Second Embodiment

Another embodiment of the present invention provides a method for establishing a timer or time point for a response to a multi-carrier management message transmitted from the ABS to the AMS.

Hereinafter, for convenience of description and better understanding of the present invention, it is assumed that the multi-carrier management message is set to the AAI_CM-CMD message and a response message is set to the AAI_CM-IND.

The ABS may change a current primary carrier through the carrier management command message (AAI_CM-CMD), or may indicate activation/deactivation of at least some parts of the assigned secondary carriers.

Hereinafter, a general primary carrier change process will hereinafter be described in detail.

Figure 5:
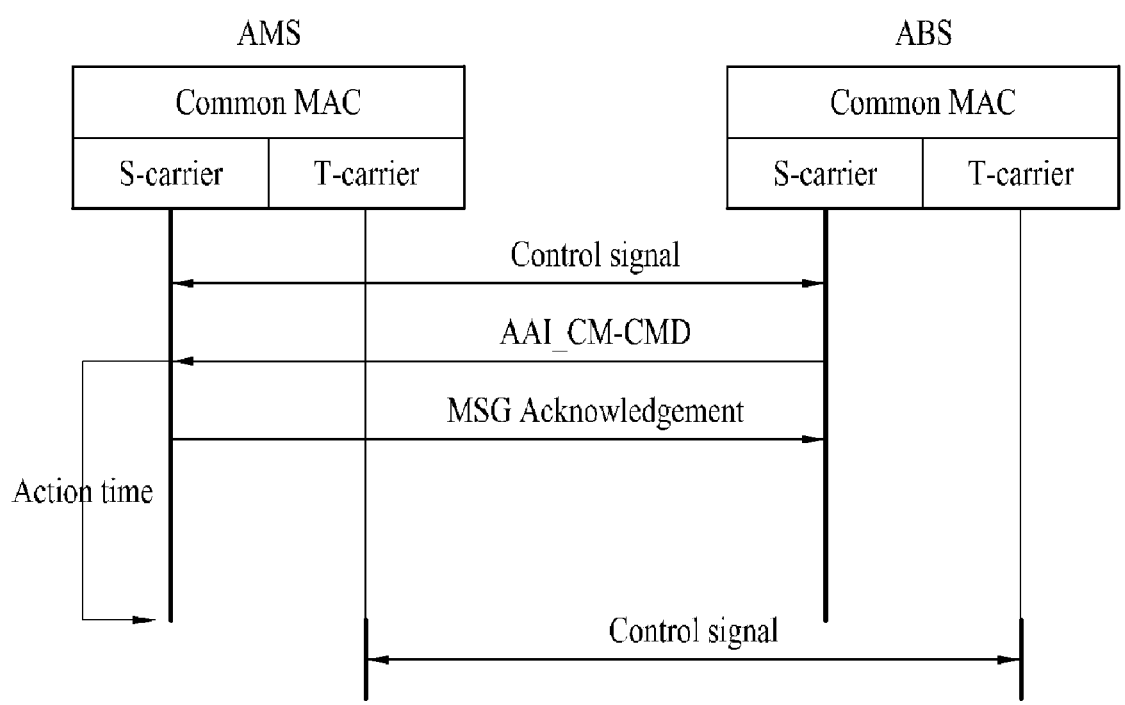
FIG. 5 illustrates a primary carrier change procedure applicable to embodiments of the present invention, i.e., a procedure for a specific case in which a target carrier is pre-activated.

FIG. 5 illustrates a primary carrier change procedure applicable to embodiments of the present invention, i.e., a procedure for a specific case in which a target carrier is pre-activated.

In the primary carrier change procedure to be described in the following drawings including FIG. 5, the current primary carrier is referred to as a serving carrier (S-carrier) and a carrier to be changed is referred to as a target carrier (T-carrier).

Referring to FIG. 5, the ABS exchanges a control signal with the AMS through the S-carrier. At this time, the ABS may transmit the AAI_CM-CMD message including primary carrier change information so as to command the AMS to change a primary carrier from the serving carrier to the target carrier. In this case, the primary carrier change information may include a physical index of the target carrier, an action time wherein a carrier change time point is indicated in units of a superframe, and a field indicating the next status of the S-carrier, etc.

The AMS having received the AAI_CM-CMD message may transmit an AAI_MSG-ACK message or an ACK extension header, etc. to the ABS so as to inform the ABS of a reception status of the message.

In this case, because the target carrier is a pre-activated carrier, the AMS changes a primary carrier from the S-carrier to the T-carrier in a superframe indicated by the action time field without performing additional synchronization or ranging for the target carrier. Thereafter, the AMS can transmit and receive control signals to and from the ABS through the target carrier.

Next, a primary carrier change procedure for the other case in which the target carrier is not activated will hereinafter be described with reference to FIG. 6.

Figure 6:
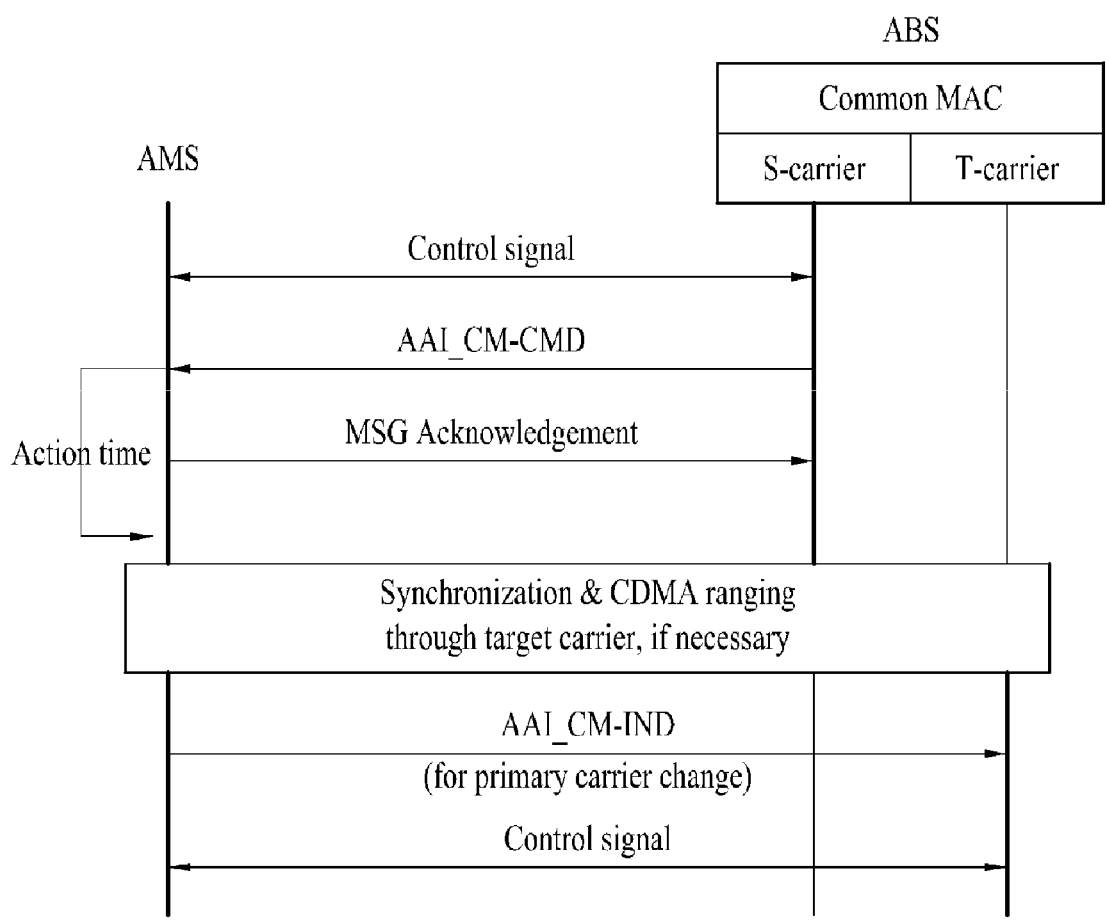
FIG. 6 illustrates a primary carrier change procedure applicable to embodiments of the present invention, i.e., a procedure for a specific case in which a target carrier is not activated.

Referring to FIG. 6, while the AMS exchanges an RF signal with the ABS through only the primary carrier, the ABS may transmit the AAI_CM-CMD message including the primary carrier change information so as to indicate the AMS's primary carrier change from the S-carrier to the T-carrier.

The AMS having received the AAI_CM-CMD message may transmit an AAI_MSG-ACK message or an ACK extension header, etc. to the ABS so as to inform the ABS of a reception status of the message.

The AMS performs synchronization and/or ranging for the target carrier in a superframe indicated by the action time field if necessary, such that it performs a primary carrier change from the S-carrier to the T-carrier. In order to allow the ABS to confirm the above primary carrier change, the AMS may transmit the AAI_CM-IND message to the ABS through the T-carrier.

Based on the above-mentioned secondary carrier activation procedure and the above-mentioned primary carrier change procedure shown in FIGS. 5 and 6, a timer according to another embodiment of the present invention will hereinafter be described in detail.

1. Timer for Defining Specific Time in which AMS can Perform Secondary Carrier Activation A timer to be described later may be referred to as an activation timer, may be operated only in the AMS, and may be defined as a time duration wherein activation of a target carrier is attempted. A value for the timer may be signaled from the ABS. If no signaling is required, the value of the timer may be defined as one of parameters established when a connection setup of the AMS is provided.

This timer may start operation at any of a first time at which the AMS receives the AAI_CM-CMD message from the ABS, a second time at which the AMS transmits the AAI_MSG-ACK message to the ABS, and a third time at which the AMS attempts to activate the target carrier.

If the timer value is signaled from the ABS, this signaling may be carried out on the condition that the timer value needs to be referred to the readiness timer of the ABS to be described later. Otherwise, if the timer value needs to be referred to the ABS for another reason, this timer value may be signaled by the ABS, and this signaling may be carried out through any one of multi-carrier (MC)-associated system information (SI) values or any one of MC-associated MAC control messages such as AAI_MC-RSP/AAI_MC-REQ /AAI_MC-ADV/AAI_CM-CMD messages.

Figure 7:
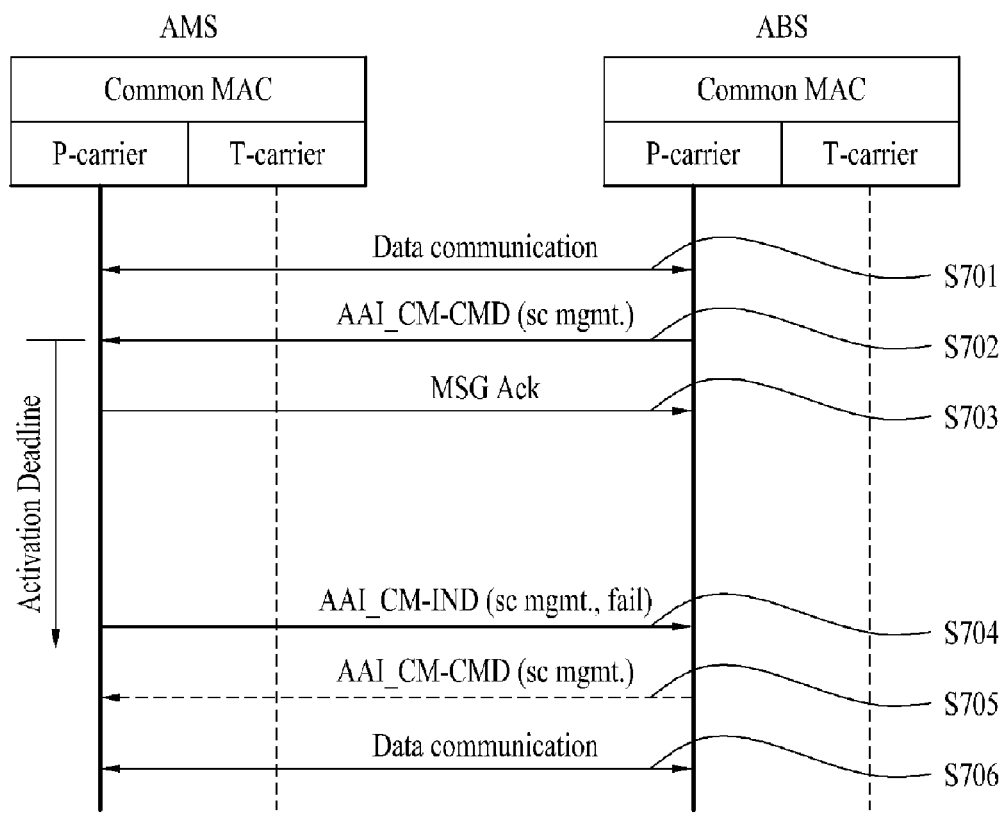
FIG. 7 is a flowchart illustrating a procedure of operations of an AMS and an ABS when the ABS fails to command secondary carrier activation indication of the ABS according to another embodiment of the present invention.

FIG. 7 is a flowchart illustrating a procedure of operations of an AMS and an ABS when the ABS fails to command secondary carrier activation indication of the ABS according to another embodiment of the present invention.

Referring to FIG. 7, while the AMS and the ABS exchange data with each other through a primary carrier in step S701, the ABS may command the AMS to activate a specific secondary carrier (i.e., a target carrier (T-carrier)) through the AAI_CM-CMD message in step S702.

The AMS that has successfully received the AAI_CM-CMD message starts driving the activation timer, and may inform the ABS of successful reception of the corresponding message through the AAI_MSG-ACK message in step S703.

When or before the activation timer expires, the AMS may inform the ABS of the result of the carrier management operation (i.e., T-carrier activation) through the AAI_CM-IND message. Herein, it is assumed that the AMS does not finish activating the target carrier (T-carrier) until the activation timer expires. Therefore, the AMS may transmit the AAI_CM-IND message including a parameter, which indicates failure in T-carrier activation, to the ABS in step S704.

The ABS retransmits the AAI_CM-IND message according to the decision result, such that it can re-inform the AMS of the T-carrier in step S705. The ABS and the AMS can continuously communicate with each other through the primary carrier in step S706.

Figure 8:
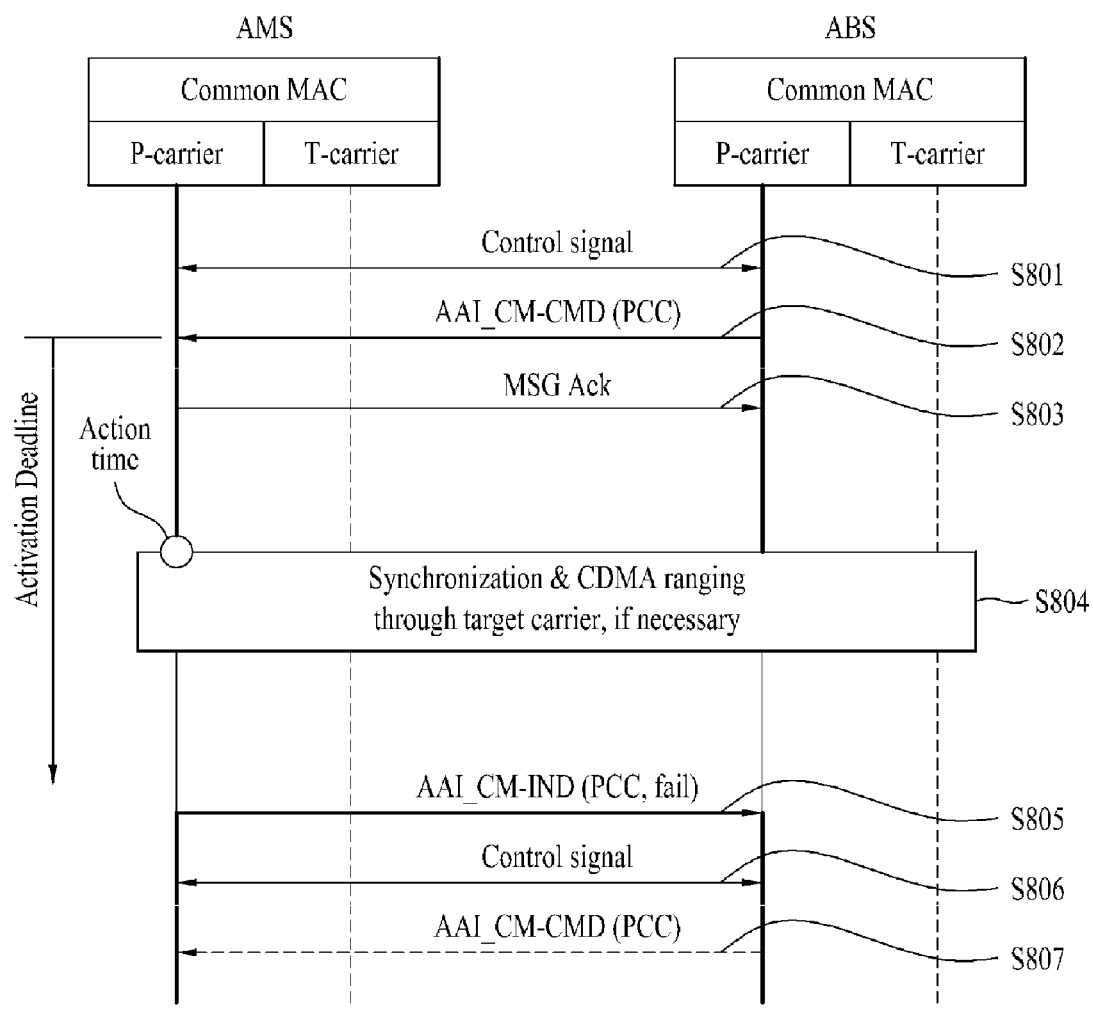
FIG. 8 is a flowchart illustrating a procedure of operations of an AMS and an ABS when the ABS fails to command primary carrier change indication of the ABS according to another embodiment of the present invention.

FIG. 8 is a flowchart illustrating a procedure of operations of an AMS and an ABS when the ABS fails to command primary carrier change indication of the ABS according to another embodiment of the present invention.

Referring to FIG. 8, while the AMS and the ABS exchange a control signal with each other through a primary carrier (P-carrier) in step S801, the ABS transmits the AAI_CM-CMD message including carrier change information to the AMS so as to command the AMS to change the P-carrier to a T-carrier in step S802.

The AMS that has successfully received the AAI_CM-CMD message starts driving the activation timer, and informs the ABS of the successful reception of the corresponding message through an AAI_MSG-ACK message or the like in step S803.

If necessary, the AMS may perform synchronization and ranging of the T-carrier at a specific time indicated by the action time field of the AAI_CM-CMD message in step S804.

When or before the activation timer is expired, the AMS may inform the ABS of the result of the carrier management operation (i.e., P-carrier change) through the AAI_CM-IND message. Herein, it is assumed that the activation timer expires before the AMS completes the P-carrier change to the T-carrier. Therefore, the AMS may transmit the AAI_CM-IND message including a parameter, which indicates failure in P-carrier change, to the ABS in step S805.

Since the AMS informs the ABS of the failure in the P-carrier change, the ABS continuously exchanges the control signal with the AMS through the previous P-carrier at step S806. The ABS retransmits the AAI_CM-CMD message if necessary, such that it can command the AMS to re-perform the P-carrier change in step S807.

2. Timer for Allowing ABS to Perform Error Handling According to whether AAI_CM-IND Message is Received In order to inform the ABS of readiness or non-readiness of a target carrier (T-carrier) of a carrier management command received from the ABS, the AMS may transmit the AAI_CM-IND message to the ABS. At this time, if the corresponding message is damaged or lost, it is impossible for the AMS to detect the loss of the corresponding message in so far as the AMS does not use an additional feedback means (e.g., a local NACK or an AAI_MSG-ACK request caused by a polling bit setup). As a result, after the AMS transmits the AAI_CM-IND message to the ABS, it determines that the activation and P-carrier change toward the corresponding T-carrier have been successfully completed, such that it monitors the DL A-MAP of the T-carrier.

In this case, the ABS does not perform scheduling through the corresponding T-carrier because of the loss of the AAI_CM-IND message, such that the loss of the AAI_CM-IND message results in failure in the carrier management operation indicated by the ABS. As a result, although the number of serious errors generated in multi-carrier (MC) operations of the overall network can be reduced, the above-mentioned operation is detrimental to power consumption of the AMS.

Therefore, in order to solve the above-mentioned problems, anther embodiment of the present invention provides another timer for retransmitting the AAI_CM-CMD message on the condition that the ABS receives a message acknowledgement (MSG ACK) signal of the AAI_CM-CMD message from the AMS and then does not receive the AAI_CM-CMD message any longer from the AMS during a predetermined time.

Preferably, this timer may be set to a sufficiently long time including a specific time (e.g., activation deadline+HARQ retransmission timer for AAI_CM-IND) in which the AMS can transmit the AAI_CM-IND message. For convenience of description, the above-mentioned timer is referred to as a "readiness timer" in the following description. Application examples of the readiness timer will hereinafter be described with reference to FIGS. 9 to 11.

Figure 9:
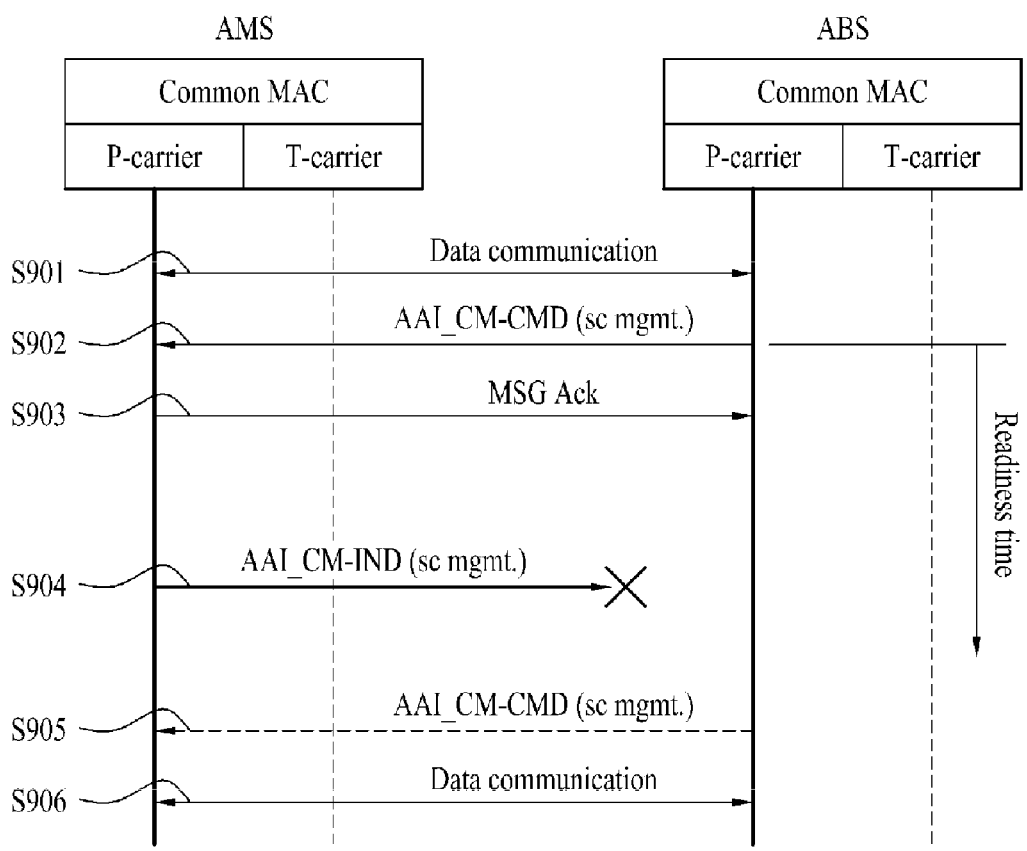
FIG. 9 is a flowchart illustrating a carrier management procedure caused by the expiration of a readiness timer when there is no additional feedback for carrier management indication message according to another embodiment of the present invention.

FIG. 9 is a flowchart illustrating a carrier management procedure caused by the expiration of a readiness timer when there is no additional feedback for carrier management indication (AAI_CM-CMD) message according to another embodiment of the present invention.

Referring to FIG. 9, while the AMS and the ABS exchange data with each other through a primary carrier (P-carrier) in step S901, the ABS transmits the AAI_CM-CMD message so as to command the AMS to activate a target secondary carrier in step S902.

The AMS that has successfully received the AAI_CM-CMD message informs the ABS of the successful reception of the corresponding message through an AAI_MSG-ACK message or the like in step S903, and at the same time the ABS starts driving the readiness timer.

After that, in the case where the ABS does not receive the AAI_CM-IND message including the result of the carrier management operation (i.e., activation of secondary carrier) indicated by the ABS from the AMS before the readiness timer expires in step S904, the ABS determines that the AAI_CM-IND message has been lost, such that it retransmits the AAI_CM-CMD message to the AMS in step S905.

Figure 10:
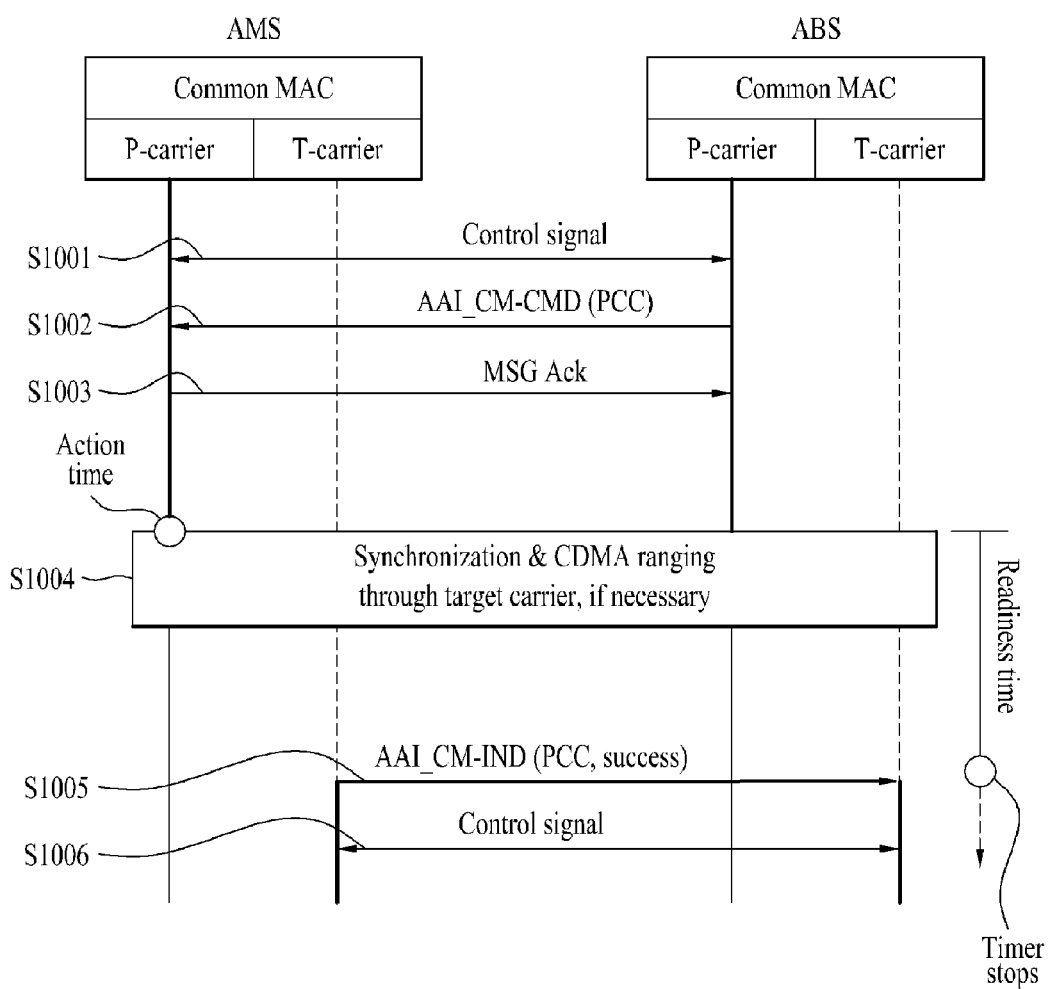
FIG. 10 is a flowchart illustrating one exemplary case in which a readiness timer is applied to primary carrier change according to another embodiment of the present invention.

FIG. 10 is a flowchart illustrating one exemplary case in which a readiness timer is applied to primary carrier change according to another embodiment of the present invention.

Referring to FIG. 10, while the AMS and the ABS exchange a control signal with each other through a primary carrier (P-carrier) in step S1001, the ABS transmits the AAI_CM-CMD message including carrier change information to the AMS so as to command the AMS to change the P-carrier to a T-carrier in step S1002.

The AMS that has successfully received the AAI_CM-CMD message informs the ABS of the successful reception of the corresponding message through the AAI_MSG-ACK message or the like in step S1003.

If necessary, the AMS may perform synchronization and ranging of the T-carrier at a specific time indicated by the action time field of the AAI_CM-CMD message in step S1004. Also, the ABS may start driving the readiness timer at a time indicated by the action time field.

When or before the readiness timer expires, if the ABS receives the AAI_CM-IND message, indicating the success of the carrier management operation (i.e., P-carrier change) indicated by the ABS, from the AMS, the ABS stops the readiness timer in step S1005.

Therefore, the ABS can exchange the control signal with the AMS through a target carrier (T-carrier).

Figure 11:
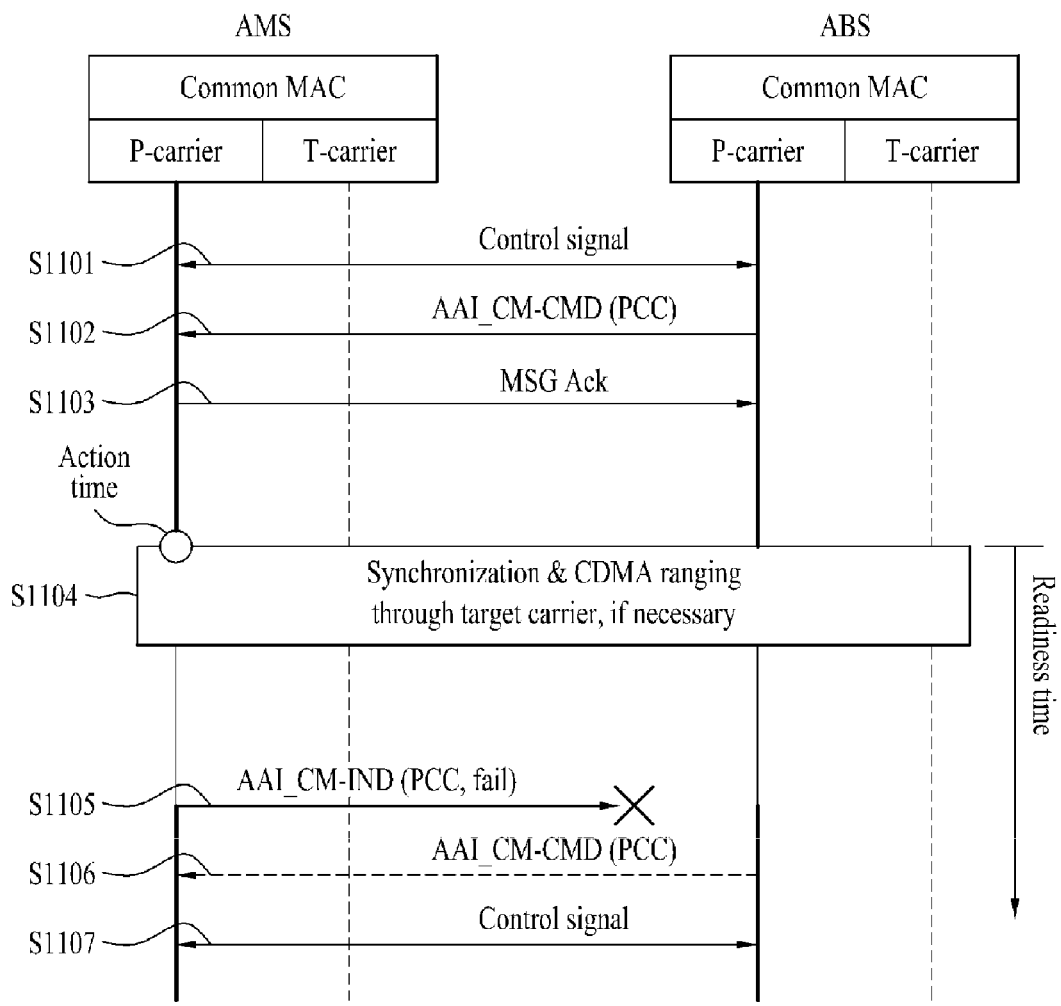
FIG. 11 is a flowchart illustrating another exemplary case in which a readiness timer is applied to primary carrier change according to another embodiment of the present invention.

FIG. 11 is a flowchart illustrating another exemplary case in which a readiness timer is applied to primary carrier change according to another embodiment of the present invention.

Steps S1101 to S1104 of FIG. 11 are similar to steps S1001 to S1004 of FIG. 10, and as such detailed description thereof will herein be omitted for convenience of description.

In step S1105, when the ABS does not receive the AAI_CM-IND message indicating the success of the carrier management operation (i.e., P-carrier change) indicated by the ABS, from the AMS (or when the AMS does not transmit the AAI_CM-IND message due to failure in the carrier change), the ABS determines that the carrier change has failed.

Therefore, the ABS can retransmit the AAI_CM-IND message to the AMS in step S1106, and exchanges a control signal with the AMS through a primary carrier (P-carrier) until the AAI_CM-IND message is received from the AMS in step S1107.

Advanced Mobile Station (AMS) and Advanced Base Station (ABS) Structure

Now a description will be given of an AMS and an ABS (femto BS (FBS) and macro BS (MBS)) for implementing the above-described exemplary embodiments of the present invention, according to another exemplary embodiment of the present invention.

The AMS may operate as a transmitter on an uplink and as a receiver on a downlink, while the ABS may operate as a receiver on the uplink and as a transmitter on the downlink. That is, each of the AMS and the ABS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 12.

Figure 12:
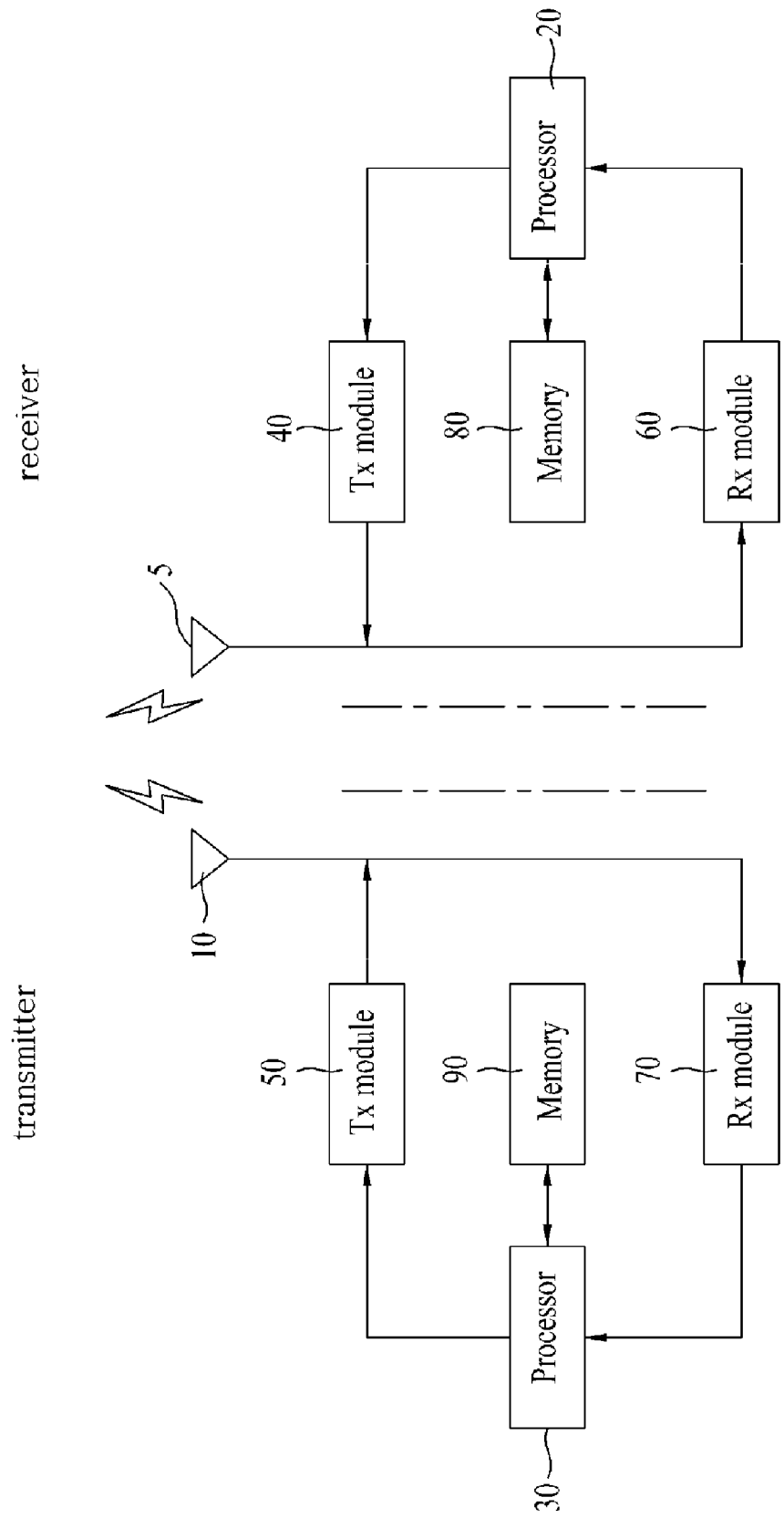
FIG. 12 is a block diagram illustrating a transmitter and a receiver according to another embodiment of the present invention.

FIG. 12 is a block diagram of a transmitter and a receiver according to another exemplary embodiment of the present invention.

Referring to FIG. 12, the left part corresponds to the transmitter and the right part corresponds to the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are complementary to those of the receiver. The components of the transmitter and the receiver will be described below in more detail.

The antennas 5 and 10 include Tx antennas for transmitting signals generated from Tx modules 40 and 50 and Rx antennas for receiving radio frequency (RF) signals and providing the received RF signals to the Rx modules 60 and 70. If Multiple Input Multiple Output (MIMO) is supported, two or more antennas may be provided.

Each of the antenna, the Tx module, and the Rx module may include an RF module therein.

The processors 20 and 30 generally provide overall control to the MS. Especially, the processors 20 and 30 may perform a controller function for implementing the above-described exemplary embodiments of the present invention, a variable Medium Access Control (MAC) frame control function based on service characteristics and a propagation environment, a handover (HO) function, an authentication and encryption function, etc. In more detail, the processors 20 and 30 may provide overall control to the HO procedure shown in FIGS. 5 to 7.

Especially, the processor of the AMS may acquire available carrier information of the ABS through MC-associated messages (e.g., AAI_MC-ADV, AAI_Global-config), and may also acquire information of the assigned carrier through the AAI_MC-REQ/RSP messages communicated with the ABS. In addition, the processor of the AMS receives an indication item related to carrier management from the ABS through the AAI_CM-CMD message, recognizes the indication item, and informs the ABS of the execution or non-execution of the corresponding indication item through the AAI_CM-IND message. In this case, if the indication item indicated by the ABS is indicative of the activation of a secondary carrier, it is preferable that transmission of the AAI_CM-IND message be performed either at a specific time indicated by the activation deadline field contained in the AAI_CM-CMD message or at any time prior to the specific time.

In the case where multi-carrier handover (MCHO) is performed and a secondary carrier of a target ABS is pre-assigned through the AAI_HO-CMD message, the processor of the AMS can inform the ABS of the activation result of the corresponding carrier through the AAI_CM-IND message either at a specific time indicated by the activation deadline field contained in the AAI_RNG-RSP message or at any time prior to the specific time.

Further, the AMS processor may provide overall control to the operations described in the above-mentioned embodiments.

The Tx modules 40 and 50 may encode and modulate transmission data scheduled by the processors 20 and 30 according to a predetermined coding and modulation scheme and provide the modulated data to the antenna 10.

The Rx modules 60 and 70 may recover original data by demodulating and decoding data received through the antennas 5 and 10 and provide the recovered data to the processors 20 and 30.

The memories 80 and 90 may store programs for processing and control of the processors 20 and 30 and temporarily store input/output (I/O) data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

What is claimed is:

1. A carrier management method for allowing a mobile station to perform carrier management in a broadband wireless access system supporting multiple carriers, the method comprising:
   receiving a first message, which includes activation information indicating activation of at least one target carrier from among one or more second carriers allocated through a first carrier, from a base station; and
   transmitting a second message, which confirms the base station of readiness of the at least one target carrier according to a result of the activation, to the base station,
   wherein the activation information includes information indicating a time point, and
   the transmission of the second message is performed at a specific time indicated by the time point information.

2. The carrier management method according to claim 1, wherein the time point information indicates a superframe number after the first message is transmitted from the base station.

3. The carrier management method according to claim 2, wherein the activation information includes at least one of an action code field set to a specific value indicating management of the second carrier, a field for indicating a number of the at least one target carrier, and a field for indicating each index of the at least one target carrier.

4. The carrier management method according to claim 2, wherein:
   the first carrier is a primary carrier, and
   the second carrier is an assigned secondary carrier which is allocated from the base station to the mobile station.

5. The carrier management method according to claim 4, wherein:
   the first message is a carrier management command (AAI_CM-CMD) message or a ranging response (AAI_RNG-RSP) message,
   the second message is a carrier management indication (AAI_CM-IND) message, and
   the second carrier is allocated to the mobile station through a multi-carrier response (AAI_MC-RSP) message.

6. A carrier management method for allowing a base station to manage carriers of a mobile station in a broadband wireless access system supporting multiple carriers, the method comprising:
   transmitting a first message, which includes activation information indicating activation of at least one target carrier from among one or more second carriers allocated to the mobile station through a first carrier, to the mobile station; and
   receiving a second message, which confirms the base station of readiness of the at least one target carrier according to a result of the activation, from the mobile station,
   wherein the activation information includes information indicating an time point, and
   the reception of the second message is performed at a specific time indicated by the time point information.

7. The carrier management method according to claim 6, wherein the time point information indicates a superframe number after the first message is transmitted from the base station.

8. The carrier management method according to claim 7, wherein the activation information includes at least one of an action code field set to a specific value indicating management of the second carrier, a field for indicating a number of the at least one target carrier, and a field for indicating each index of the at least one target carrier.

9. The carrier management method according to claim 7, wherein:
the first carrier is a primary carrier, and
the second carrier is an assigned secondary carrier which is allocated from the base station to the mobile station.

10. The carrier management method according to claim 9, wherein:
the first message is a carrier management command (AAI_CM-CMD) message or a ranging response (AAI_RNG-RSP) message,
the second message is a carrier management indication (AAI_CM-IND) message, and
the second carrier is allocated to the mobile station through a multi-carrier response (AAI_MC-RSP) message.

11. A mobile station for supporting a multi-carrier operation in a broadband wireless access system, the mobile station comprising:
a processor; and
a radio frequency (RF) module for transmitting and receiving an RF signal to and from an external part upon receiving a control signal from the processor,
wherein the processor acquires activation information, which indicates activation of at least one target carrier from among one or more second carriers allocated through a first carrier, through a first message received from a base station; and transmits a second message, which confirms readiness of the at least one target carrier according to a result of the activation, to the base station, wherein the activation information includes information indicating an time point, and
the transmitting of the second message is performed at a specific time indicated by the time point information.

12. The carrier management method according to claim 11, wherein the time point information indicates a superframe number after the first message is transmitted from the base station.

13. The carrier management method according to claim 12, wherein the activation information includes at least one of an action code field set to a specific value indicating management of the second carrier, a field for indicating a number of the at least one target carrier, and a field for indicating each index of the at least one target carrier.

14. The carrier management method according to claim 12, wherein:
the first carrier is a primary carrier, and
the second carrier is an assigned secondary carrier which is allocated from the base station to the mobile station.

15. The carrier management method according to claim 14, wherein:
the first message is a carrier management command (AAI_CM-CMD) message or a ranging response (AAI_RNG-RSP) message,
the second message is a carrier management indication (AAI_CM-IND) message, and
the second carrier is allocated to the mobile station through a multi-carrier response (AAI_MC-RSP) message.

* * * * *